UNITED STATES PATENT OFFICE.

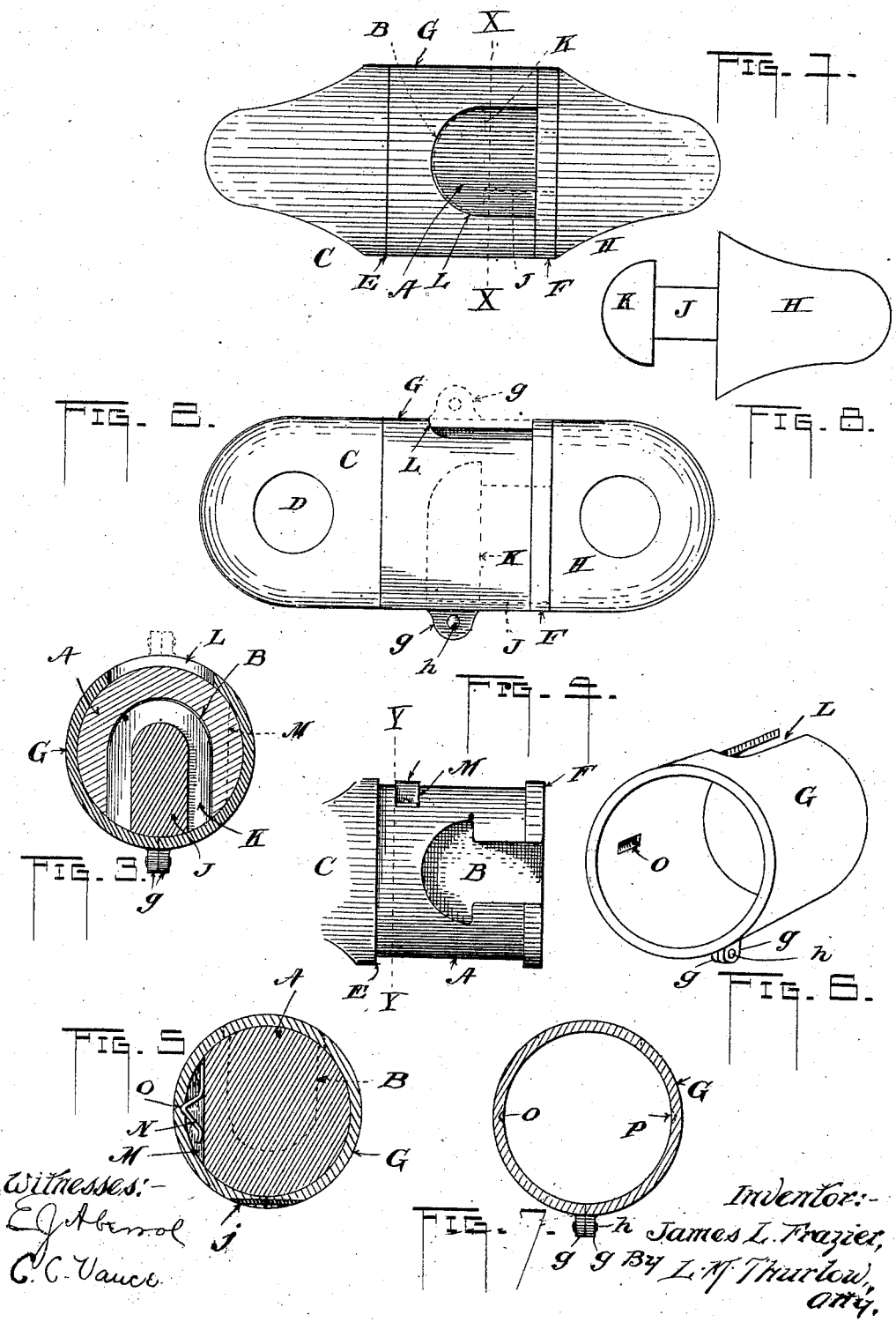

JAMES L. FRAZIER, OF PEORIA, ILLINOIS, ASSIGNOR TO GRAVITY COUPLER COMPANY, A CORPORATION OF ILLINOIS.

CAR-COUPLING.

No. 850,301.           Specification of Letters Patent.           Patented April 16, 1907.

Application filed August 14, 1905. Serial No. 274,229.

*To all whom it may concern:*

Be it known that I, JAMES L. FRAZIER, a citizen of the United States, residing at Peoria, in the county of Peoria and State of Illinois, have invented certain new and useful Improvements in Car-Couplings; and I do hereby declare that the following is a full, clear, and exact description of the invention, which will enable others skilled in the art to which it appertains to make and use the same.

This invention has reference to couplings for use on mining-cars, but is equally adapted for use on such other vehicles as can use or may require a coupling.

The object of the invention is to provide a simple form of coupling for the purposes named that will not become separated while in use.

Another object is to produce a two-part coupling the members of which are prevented from separating by a friction-held shiftable sleeve.

An object also is to provide a modification of the form of coupling shown in my former application hereinafter referred to.

In the accompanying drawings, Figure 1 is a top view of my coupilng. Fig. 2 is a side view of the same. Fig. 3 is a transverse section of the coupling through line X X, Fig. 1. Fig. 4 is a view of the bottom of one section of the coupling, showing a spring in one side of said section. Fig. 5 is a transverse section on the line Y Y, Fig. 4. Fig. 6 is a perspective view of a sleeve which forms part of the coupling. Fig. 7 is a transverse section of the same. Fig. 8 is a top view of a companion member to that shown in Fig. 4.

In the figures, A indicates a member of cylindrical form provided with a socket B, extending partially therethrough in a transverse direction. Said socket may be of variable depth and may even extend entirely through the member, if desired. One end of the said member A is provided with a flattened extremity C, having an eye D therein, there being a shoulder E between the cylindrical portion and the said extremity, the purpose of which will be explained presently. The opposite extremity of the member is provided with a rim or bead F, substantially of the same diameter as the extension C described. Thus a channel is created in the member A, and a sleeve G (shown in Fig. 6) is designed to seat therein, as shown in Figs. 1 and 2. H is a companion member having a tongue J, provided with a head K, (see dotted lines, Fig. 1,) to seat in the socket B of the same form. Said member H corresponds to the portion C, merely having the tongue J formed therewith, which is designed to enter the socket B, the coupling and uncoupling operation being necessarily in a transverse direction. The sleeve G has a notch at L, as shown in Figs. 1 and 6, sufficiently large to slightly more than expose the socket when in register therewith, and it will be understood that when the sleeve is positioned to expose the socket the tongue may be readily removed or inserted. The foregoing has been fully explained in my former application, Serial No. 263,791, filed on the 5th day of June, 1905, wherein the sleeve is weighted to normally hold the notch out of registry with the socket and tongue, the uncoupling being accomplished by raising the weighted portion against the force of gravity to carry the notch into registry with the said socket.

In the present application it is my desire to illustrate the same coupling and its sleeve but eliminate the weight feature and substitute a friction-spring for the sleeve. To the end that this may be understood, I have shown in Figs. 4 and 5 a notch or groove M in one side of the member A within the channel intended for the sleeve G, said groove being substantially parallel with the sides of the socket B. In the bottom of the groove a flat spring N is secured by one of its ends. The spring is bent in the form of an A with the apex normally extending slightly beyond the groove and the body A, the free end of the same being free to slide on the bottom of the groove as pressure is put upon the apex. The sleeve is provided with a notch or depression O, so located within said sleeve that the spring enters it when the notch L is out of register with the socket, as shown in Fig. 3, the mouth of said socket opening beneath the body A, as shown in said figure, the tongue resting upon the sleeve, as described in my former application referred to.

The sleeve is preferably formed from a strip of metal bent into a cylinder, each end having a small lug $g$, which when brought together are held by means of a rivet $h$ or other like means. These lugs answer as a means of grasping the sleeve to turn it within the channel of the member A; but evidently said lugs are not necessary to this operation, since said sleeve can be inclosed by the hand and turned as easily without them. In Fig. 5 is shown a modified form of sleeve in which the ends thereof merely abut, and a rivet $j$ holds them together. Since the notch or groove M is normally engaged by the spring when the coupling members are connected, it is evident that the said members cannot become separated and that the sleeve will not voluntarily move from its position no matter how much jarring takes place; but when desired to release the members the sleeve is turned in either direction until the notch L is made to uncover the socket and tongue, and since the socket opens downward, as already intimated, the tongue will at once leave its seat by gravity. Evidently as the sleeve is turned the spring will be depressed by the inner surface of the former as the notch is carried away from it. If desired, a notch may be placed at the opposite side of the sleeve, as at P, Fig. 7, so that the sleeve may then be held at the open position until the coupling is again made at some future time. Of the entrance of the spring into the notch of the sleeve the operator is readily aware by reason of his sense of touch, the spring when it enters producing a slight resistance to further rotation of said sleeve.

The spring may be made stiff enough to keep considerable friction upon the inside of a smooth sleeve or one having no depression therein, and thereby accomplish the same end as the means described, and, in fact, various frictional means may be employed, if desired, without departing from the spirit and intent of the invention.

What I claim is—

1. A device of the class described comprising two interlocking members separable only in a transverse direction and a device rotatable about the interlocked members and having a transverse opening therein for permitting entrance and removal of one of said interlocking members in said transverse direction, said device having provision for holding it at any position placed.

2. A coupling comprising two members adapted to interlock only in a transverse direction, and a device carried by and fitting closely around one of the members, the same adapted to normally prevent separation of said members transversely when they are interlocked, there being provision in such device for exposing the place of separation of the member by a partial turn thereof and permitting removal of one member from the other therethrough in said transverse direction only and having provision for maintaining any position at which it may be placed.

3. The combination with a coupling member having a socket extending into it laterally, of a coacting coupling member having a part adapted to enter said socket and to be removed therefrom only in a transverse direction, and frictionally-held means adapted to be moved into and out of position for preventing such removal, substantially as set forth.

4. A coupling of the class described comprising two members adapted to interlock, a sleeve carried by and closely fitting around one of the members and adapted to inclose both said members, there being a transverse notch in part of the sleeve to permit the passage of one of the members therethrough only in a transverse direction, and means for frictionally holding the sleeve normally in a position to prevent separation of said members.

5. A coupling comprising two interlocking members adapted for separation only in a transverse direction, one having a socket and the other a tongue to enter and engage such socket, a sleeve carried by one of the members for closing the socket for the purposes described, a spring carried by one of the members and a depression in the inside of the sleeve for receiving the spring substantially as set forth.

6. In a coupling of the character described, a pair of interlocking members adapted to separate only in a transverse direction, there being a peripheral channel in one of them, a sleeve seated in said channel and adapted to turn therein and preventing the separation of the members when in one position, there being a notch in the sleeve to permit separation when said notch is in register with the place of separation, and a spring carried on one of the members for engaging the sleeve and holding it in a desired position, there being provision for preventing separation of the interlocking members except in a transverse direction.

7. A coupling of the character described comprising two members adapted to interlock only in a transverse direction, a third member carried on one of such interlocking members and revoluble thereon but stationary at its position of revolution and serving when in one position to lock both members from separating but permit separation of the members when changed in position, and means for frictionally holding said third member in a desired position.

8. In a coupling of the character described, two members adapted to interlock, there being a socket in one end and a tongue on the other, a revoluble member carried by one of the engaging members for holding the said members normally engaged, and a spring for positively holding the revoluble member in a position to expose the socket transversely through the revoluble member, and likewise to hold it in a positive position covering the socket.

9. In a coupling of the character described, a pair of interlocking members adapted to separate in a transverse direction, there being a peripheral channel in one of them, a rotatable sleeve seated in said channel adapted for preventing the voluntary separation of the members, there being a notch in the sleeve for permitting separation of said member when desired, one of the members being removed from its companion through said notch, and a spring carried on one of the members for engaging the sleeve and normally holding it in a position to cover the place of separation of the members.

10. A coupling comprising two interlocking members, one having a socket and the other a tongue to enter and engage such socket, a sleeve carried by one of the members, a spring also carried by one of the members, and a depression in the inside of the sleeve for receiving the spring for the purposes set forth.

11. A coupling of the class described comprising a member provided with a socket having an enlarged opening, a companion member therefor having a tongue with an enlargement at its end to engage with the socket in a transverse direction as described, a friction-held sleeve carried by the socket member for covering the socket and tongue when interlocked, and adapted also to expose the said socket and tongue by a partial shifting movement thereof to permit the separation of the members in a transverse direction.

In testimony whereof I affix my signature in presence of two witnesses.

JAMES L. FRAZIER.

Witnesses:
E. J. ABERSOL,
L. M. THURLOW.